United States Patent [19]

Best

[11] Patent Number: 4,886,044
[45] Date of Patent: Dec. 12, 1989

[54] INFRARED GAS GRILL

[76] Inventor: Willie H. Best, 18C The Heritage, Columbia, S.C. 29201

[21] Appl. No.: 233,162

[22] Filed: Aug. 17, 1988

[51] Int. Cl.$^4$ ............................ F24C 3/00; A47J 27/52
[52] U.S. Cl. .................................. 126/39 C; 126/39 R; 126/41 R; 97/340; 97/315; 97/400; 97/444
[58] Field of Search ............ 126/39 BA, 275 E, 39 C, 126/41 R, 39 D; 99/340, 446, 375, 400, 444

[56] References Cited

U.S. PATENT DOCUMENTS

| | | | |
|---|---|---|---|
| 4,321,857 | 3/1982 | Best | 99/340 |
| 4,606,261 | 8/1986 | Bernardi | 99/446 X |
| 4,608,917 | 9/1986 | Faaborg | 99/340 |
| 4,662,349 | 5/1987 | McKenzie et al. | |
| 4,762,059 | 8/1988 | McLane, Sr. | 99/446 X |

Primary Examiner—Larry Jones
Attorney, Agent, or Firm—Hurt, Richardson, Garner, Todd & Cadenhead

[57] ABSTRACT

A hollow, upright cabinet supports therein a cooking grid and a plurality of upwardly facing gas burners which emit infrared head toward the cooking grid. A shield assembly having angled baffles is removeably mounted over the burners to shield the meat directly above the burners on the grid from the infrared rays and protects the burners from the drippings of the meat. The spaced baffles however permit the infrared radiation to pass upwardly, at an angle to impinge on meat at the rear of the grid.

26 Claims, 3 Drawing Sheets

INFRARED GAS GRILL

BACKGROUND OF THE INVENTION

1. Field of the Invention

This invention relates to infrared gas grills and is more particularly concerned with an apparatus and process for cooking food items, particularly meats.

2. Description of the Prior Art

In the past, I have developed an infrared gas grill which is the subject matter of U.S. Pat. No. 4,321,857 issued Mar. 30, 1982 entitled INFRARED GAS GRILL. The gas grill of my prior patent has been used domestically as an outdoor barbecue grill. While it has the advantage of being able to provide uniform heat for cooking foods in a short period of time and to vaporize the meat drippings for imparting the burned flavor into the meat, the drippings from meats on the ceramic heating element tends to make the ceramic element brittle. Also, there tends to be flare-ups when substantial amounts of grease drip onto these exposed burners. The burners also tend to become soiled or clogged with extended heavy use.

The present invention differs from my prior art grill in that the ceramic heating elements are shielded from the dripping of the meat and the infrared heat is distributed so as to provide infrared radiation from the burners in an angular direction so that a single burner section provides more concentrated heat to meats at the rear portion of the cooking grid than at the front portion. Other differences will be recognized.

Also in the prior art is U.S. Pat. No. 4,662,349 issued May 5, 1987 to McKenzie et al., which discloses an infrared gas grill operated with liquified petroleum gas. In that patent, the cooking elements or heat generating systems are suspended on cross rods within the burner cavity.

SUMMARY OF THE INVENTION

Briefly described, the present invention includes a tubular, upright, rectangular, sheet metal cabinet which carries a smaller, tubular, rectangular, removable heat shield, received through the top of the cabinet, suspended by it upper flanges, which overlap the flanges at a top of the cabinet. The back of the cabinet extends above the level of the front portion of the grill to support the grid at an angle, if desired.

Within the cabinet are cross bars which support removably plenums of a plurality of emitter assemblies, the emitters of which are formed by juxtaposed, flat, rectangular, abutting foraminous, infrared, radiant, ceramic burner elements, a group or section of which are sandwiched between upper and lower frames bolted to the top of each plenum. A horizontal gas supply manifold, mounted forwardly of the emitter assemblies in the forwardmost portion of the cabinet, threadedly receives a plurality of gas valves all of which protrude radially from the gas pipe.

The front portion of each plenum has a U-shaped bracket which receives the end portion and nozzle of a gas valve for aligning the nozzle with a venturi and for directing the gas and entrained air through the interior of the venturi and into the chamber of the plenum. Outwardly protruding tabs on the rear portions of each plenum are disposed over one of the cross bars so that removable clamps secure these tabs in place to fix the position of the emitter assemblies in transverse spaced longitudinally extending relationship in the cabinet.

Pilot tubes are also connected to the gas pipe, each pilot tube protruding upwardly and then rearwardly so as to terminate over the frontmost emitter or burner element of each plenum for providing a pilot light for lighting the gas when the appropriate valve is opened.

Each of the ceramic burner elements or emitters is provided with a plurality of holes through which the gas from the plenum chamber passes for creating flames along the upper surface of the element. The cooking grid can be selectively arranged horizontally or at an incline over the heating elements.

Removably disposed within the cabinet and over the burner elements of each emitter assembly is a deflector and shield assembly having a plurality of spaced transversely disposed emitter shields which also functions as a radiation deflector members which are spaced above and extends across the burner elements. Legs on the deflector assembly are received on the outer shoulders of the bezel or upper frame to support the shield assembly in its horizontal position spaced above and over the burner elements. The emitter shields are each L-shaped, plates mounted on a base frame so that they extend upwardly and rearwardly therefrom. These shields prevent the grease from dripping into the burner and also direct the infrared radiation from the burner elements upwardly and rearwardly. Grease dripping from meats are deflected by each shield and drip downwardly to be collected at the bottom in a trough of the shield for vaporization. Thus, the forward part of the cooking grid is shielded from the direct, infrared rays of the burner elements by the shields while the food toward the rear portion of the grid receives the rays at an acute angle from the radiant burner elements.

The bottom portion of the cabinet is provided with a drip pan which slides into the cabinet beneath the plenums, the drip pan being also slidable outwardly so that it can be removed, as desired. When installed, the drip pan protrudes well beyond the plenums so that it catches directly any grease which drips off of the food or meat which is arranged on the rearmost portion of the cooking grid.

The deflector assembly is about as long as the emitter assembly and is a separate unattached member which is quite readily installed on and removed vertically from the side flanges of the top frame of the emitter assembly and can be moved longitudinally so as to permit access to the pilot light when the deflector assembly is slid rearwardly and and moved forwardly for being properly positioned over the burner elements when in its forwardmost position.

Accordingly, it is an object of the present invention to provide an improved infrared grill which is inexpensive to manufacture, durable in structure, and efficient in operation.

Another object of the present invention is to provide an improved infrared gas grill in which the ceramic burner elements are protected from grease dripping into the burner from meat supported on the cooking grid.

Another object of the present invention is to provide an improved infra-red gas grill which is capable of varying and directing the infra-red energy which provides for the meat at one location on the cooking grid to be exposed to a heat level different from meat at another location.

Another object of the present invention is to provide an improved infrared gas grill which will readily and easily vaporize the greases dripping from the meats supported on the cooking grid so that the vapors will impregnate and flavor the meats as they are cooked.

Another object of the present invention is to provide, in a radiant gas grill, a shield or deflector assembly which will protect the ceramic burner elements from greases and juices dripping from the food while at the same time directing the infra-red radiation to the lower surfaces of the cooking grids at controlled angles to the cooking grids and controlled intensity.

Another object of the present invention is to provide an infra-red gas grill in which the shield/deflector can reduce or block the infra-red radiation from the operator or on a portion of the cooking grids.

Another object of the present invention is to provide in an infrared grill, a system by which the greases, which drip from meat disposed on the cooking grid, are directed away from the burner elements and are either evaporated or channeled to a drip pan.

Another object of the present invention is to provide a grill in which the cooking grid can be arranged horizontally or angularly for the purpose of spacing the different foods at different distances from the infrared heat source, by positioning such foods at different locations along the cooking grid.

Another object of the invention is to provide a radiant burner element which can be readily and easily replaced.

Other objects, features and advantages of the present invention will become apparent from the following description when taken in conjunction with the accompanying drawings wherein like characters of reference designate corresponding parts throughout the several views.

DESCRIPTION OF THE PREFERRED EMBODIMENT

Figure 1:
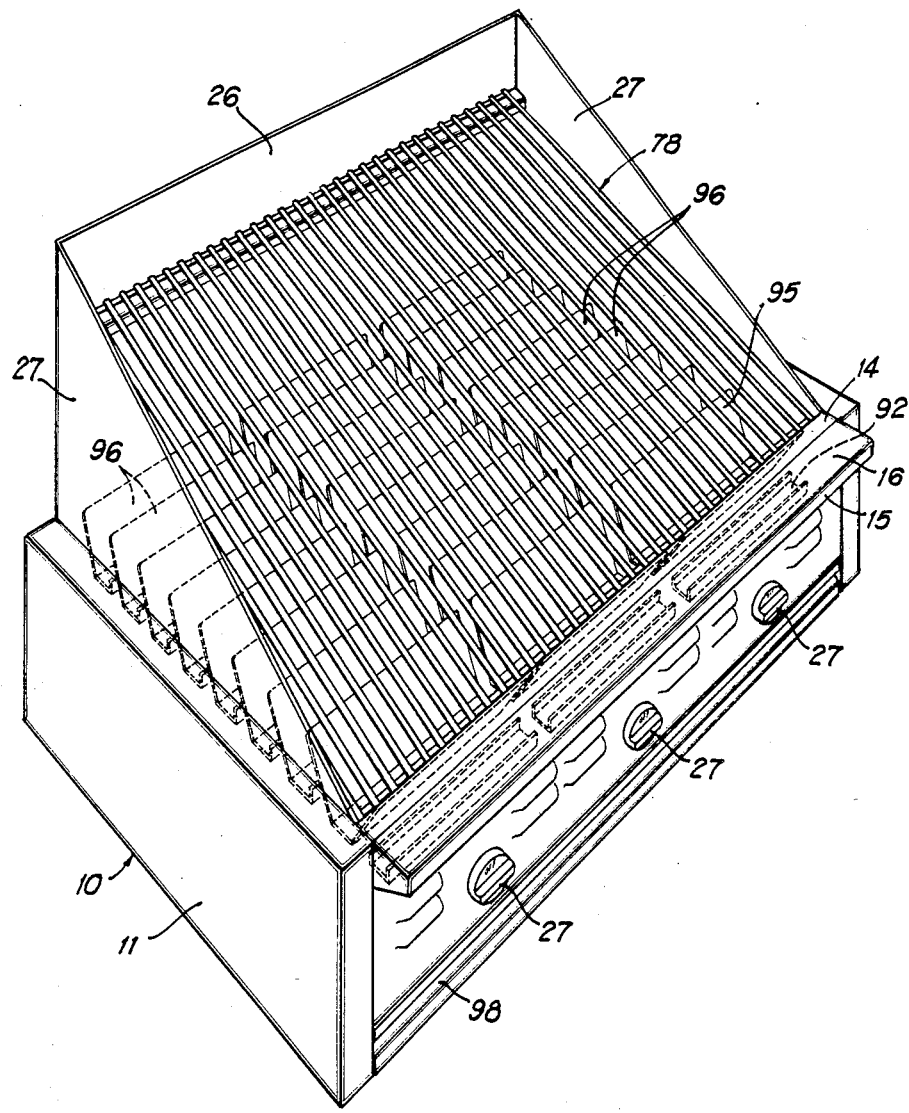
FIG. 1 is a perspective view of an improved infrared gas grill constructed in accordance with the present invention and showing the cooking grid supported an incline in the grill, the shields or deflector assemblies being shown in broken lines.
Figure 2:
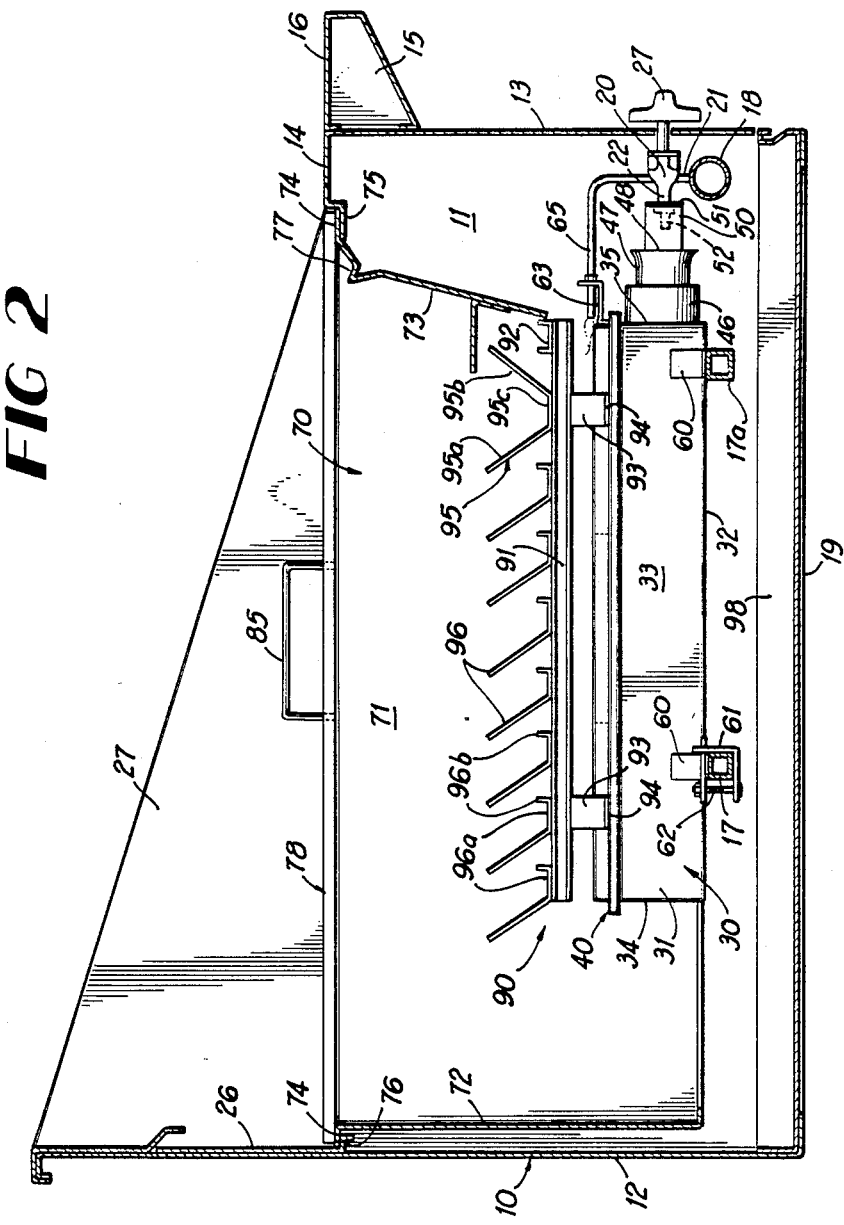
FIG. 2 is a vertical sectional view of the grill shown in FIG. 1 and showing the cooking grid in a horizontal position.

Referring now in detail to the embodiment chosen for the purpose of illustrating the best mode contemplated for carrying out the present invention, numeral 10 in FIG. 1 and FIG. 2 denotes generally an upright sheet metal cabinet of the grill depicted in the drawings. The cabinet 10 is a rectangular, tubular member having an open interior defined in part by opposed, parallel, rectangular, vertical, side walls 11 the rear ends of which are joined by a back wall 12 and the front edges of which are joined by a front wall 13. This front wall 13 terminates in an inwardly turned upper flange 14. A forwardly protruding block 15 is mounted on the front surface of the wall 13 and this block 15 has an upper surface 16 which is disposed in a common plane with the flange 14 so as to provide a surface on which plates or the like may be placed to receive the food, removed from the grill. The cabinet has a bottom 19 closing the end of cabinet 10.

Within the grill are spaced, parallel, transversely extending, burner supporting bar 17 and 17a which are arranged in the lower portion of the cabinet 10. Disposed parallel to and forwardly of the front support bar 17a is a gas manifold 18 which extends transversely across the inner portion of the cabinet 10. This gas manifold 18 connects to an appropriate source of gas (not shown).

Mounted at transversely spaced intervals along the gas manifold 18 are a plurality of valves, such as valve 20. Each such valve 20 includes an externally threaded, downwardly extending intake tube 21 which is threadedly received in an appropriate hole in the upper surface of the manifold 18 so that its discharge tube 22 will protrude rearwardly and be in transversely spaced parallel relationship to other discharge tubes 22 of the other valves 20. The valve stem 23 of each valve 20 protrudes forwardly through an appropriate opening in the front wall 13 so as to receive a control knob 24, thereon.

The interior of the cabinet 10 is provided with a plurality of juxtaposed, logitudinally extending, emitter assemblies 30. Usually two or three emitter assemblies 30 are disposed in a single cabinet 10 side-by-side on bars 17, 17a. Each emitter assembly 30 includes a gas plenum 31 which is an elongated, rectangular, hollow, box member having a rectangular bottom 32 and a pair of opposed sides 33, a rear end plate 34 and a front end plate 35. Within the upper portion of the interior or chamber of the plenum 31 is a perforated metal sheet which forms a gas air mixer baffle 40 which extends across substantially the entire upper portion of the plenum 31. The function of the baffle 39 is to more thoroughly mix and distribute the air gas mixture which is fed into plenum 31.

Figure 3:
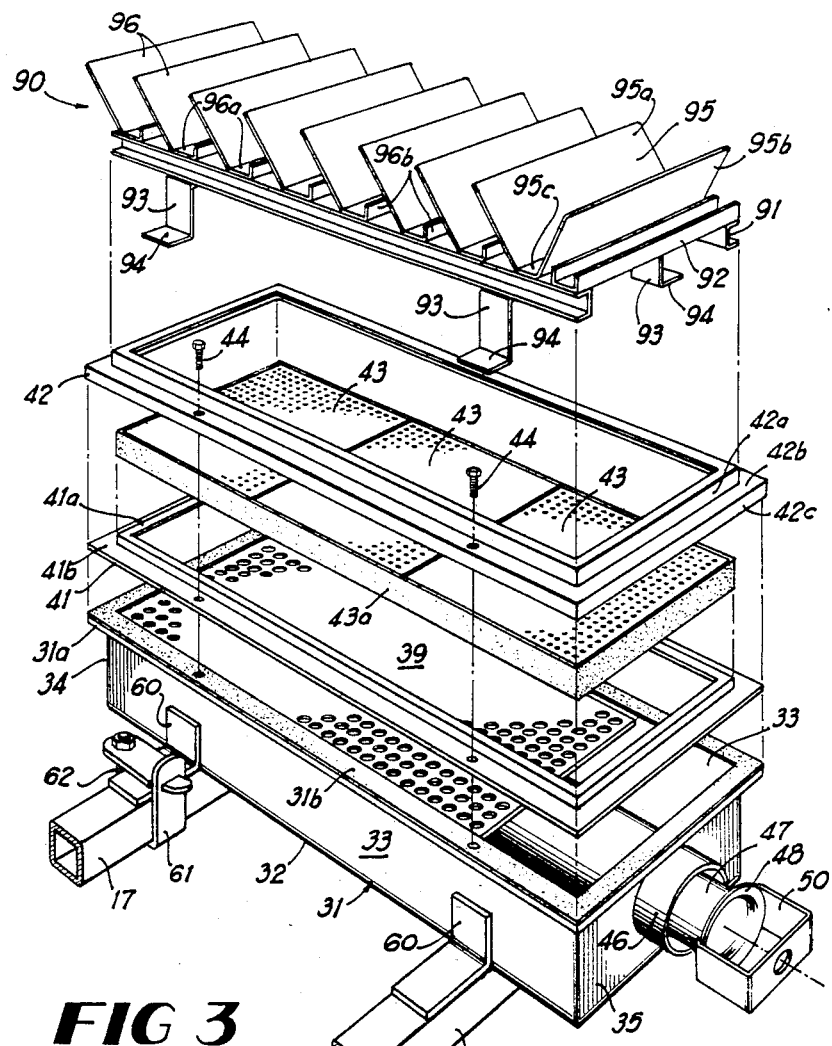
FIG. 3 is an exploded perspective view of the heating element of the grill depicted in FIG. 1.

The plenum 31 at its uppermost portion is provided with a parimetral outwardly extending flange 31a, best seen in FIG. 3. A fabric gasket 31b is provided over the flange 31a and is adapted to receive thereon the bezel or frame member of the ceramic burner. In more detail this bezel or frame member includes a lower frame 41 and an upper frame 42. The lower frame 41 includes a flat, hollow, upstanding, rectangular, frame member 41a provided with a lower, outwardly protruding, flange 41b. The flange 41b conforms to the shape and size of the flange 31a so that it can seat on and register with the gasket 31b of plenum flange 31a. The upper edge of the frame member 41a receives a plurality of three square or rectangular, juxtaposed burner elements or emitters 43, each of which has a plurality of holes 43a therein, through which the air gas mixture passes to be burned on the upper surface of the burner element 43. Each burner element 43 is surrounded along its edges with fibrous gasket material 43a and three such burner elements 43 are arranged in juxtaposition with their adjacent edges abutting to form a group of burner elements 43.

This group of burner elements 43 are received in the confines of the body 42a of the upper frame 42, the upper frame 42 having a lower flange 42b which protrudes outwardly from the bottom portion of body 42a and terminates in a downwardly turned lip 42c. The body 42a has an inwardly turned upper lip 42d. The lip 42c and the flange 41b are spot welded together so as to retain the burner elements 43 in this closed frame. Bolts 44 pass through the flanges 42a, 41b through gasket material 31b and, thence, are threadedly received in the flange 31a. Usually two bolts per side are needed to retain the flanges 42b, 41b and 31a in registry. Thus, by removing the four bolts 44, the burner element assembly as a unit can be readily replaced, as desired.

Protruding rearwardly through the front plate 35 and terminating in approximately the midportion of the interior or chamber of the plenum 31, below baffle 39, is a fixed, hollow, tubular, cylindrical, guide tube 46, the open outer end of which terminates outwardly of the front plate 35 of the plenum 31 and the open inner end of which terminates in the central portion of the interior or chamber of the plenum 31. A smaller diameter, slidable venturi tube 47 which is longer than the guide tube 46 is moveably inserted into and received within the guide tube 46. The outer end 48 or throat of venturi tube 46 is flared so as to facilitate mixing of air and gas entering the venturi tube 47.

Surrounding the flared throat or end 48 is a U-shaped bracket 50, the spaced ends of which are secured to the front plate 35 so that the legs of bracket 50 straddles the end of both tube 46 and tube 47 and support a transverse base which is parallel to and spaced forwardly of the front plate 35 and also outwardly of the venturi throat 48.

The discharge tube 22 of each valve 20 protrudes through a central hole in the base of each bracket 50, when each plenum 31 is appropriately installed in the interior of the cabinet 10. A nut 51, threadedly received on the discharge tube 21, fixes the tube 21 to the bracket 50 and a gas nozzle 52 is threadedly received on the end portion of discharge tube 21 so to direct gas axially rearwardly into the central portion of the flared end or throat 48 of the venturi tube 47. By sliding the venturi tube 47 forwardly and rearwardly the appropriate mixture of air and gas can be achieved. The force of the gas is sufficient to cause the gas to mix with the air as it enters and passes through the venturi tube 47 so that a combustible mixture of air and gas is discharged in and maintained within the plenum 31, this gas air mixture passing through the holes in the baffle 39 and through the ceramic emitter burner elements 43.

The sides 33 of the plenum 31 are respectively provided with opposed L-shaped tabs 60, the vertical leg of each tab 60 being welded to one side 33 and the horizontally leg of which protrudes outwardly from that side 33 in a plane parallel to the plane of bottom 32. A clamp 61 having a bolt 62, clamps the tab 60 against the upper surface support bar 17, when the plenum 31 is appropriately positioned. Thus, by removing two bolts 62, and by removing the nozzle 52 and nut 51, the emitter assembly 30 can be removed from the interior of the cabinet 10.

Mounted by one end to the front portion of upper flange member 40 is a Z-shaped pilot light bracket 63, the other end of which is provided with a hole through which one end portion of an L-shaped pilot light tube 64 projects. The other end of the L-shaped pilot light tube 64 is connected to and communicates with the gas manifold 18. A stop 65 on the gas tube determines how far the end portion of the gas tube 64 will project over the ceramic heating elements for lighting the same. The pilot light tube 64 may be provided with an individual valve (not shown), so that it may be turned "off" or "on", as desired.

The back wall 12 of the cabinet 10 protrudes above the horizontal plane of front flange 14 and is provided with a reinforcing L-shaped back plate 26 extending down along the front surface of wall 12. Secured to the side edges of back plate 26 are a pair of triangular, opposed, spaced, forwardly extending, splash guards 27 which terminate at front flange 14.

A hollow, tubular, open ended, generally rectangular fire guard, denoted generally by the numeral 70, is removably received within the cabinet 12. This fire guard 70 has a pair of opposed side panels 71 the inner ends of which are joined by a rear panel 72 and the front ends of which are joined by a front panel 73. The upper edge of fire guard 70 is provided with an outwardly turned parimetral flange 74 by which the fire guard 70 is suspended, the parimetral flange 74 being received on shoulders 75 and 76 respectively on flange 14 and at the bottom of back plate 26.

The front panel 73, below flange 74, is bent inwardly and upwardly to provide a transverse angled notch 77 which removably supports the front edge of the food support cooking grid 78, when the grid 78 is to be arranged at an acute to the horizontal angle as shown in FIG. 1. Also there are spaced brackets 79 on the front surface of the back plate 26 in order to support the rear edge of food grid 78 when grid 78 is at an inclined acute angle.

The flange 74 receive opposed, vertically slidable, handles 85 through holes, therein. These handles 85 are U-shaped bales having enlarged heads at the ends of the bales which preclude the bales from passing outwardly through the holes in the flanges 74. Thus, the guard 70 can be readily lifted by the two handles 85 and inserted into the interior of the cabinet 10.

Removably carried by the upper frame 42 of the emitter assembly 30 is a grease shield and radiant deflector assembly denoted generally by the numeral 90, this shield assembly 90 includes a pair of opposed, transversely spaced, channel shaped, parallel rails 91 joined at their forward end by a U-shaped, upwardly opening channel crossbar 92. Each rail 91 is provided with a pair of legs 93 which depend or protrude downwardly and then are bent outwardly so as to provide horizontally disposed, outwardly extending feet 94. The legs 93 are transversely spaced from each other sufficiently that the legs 93 straddle the upper burner elements 43 and the feet 94 rest upon the upper surface of the outwardly protruding flange 42c.

Rearwardly of the crossbar 92 is a V-shaped emitter shield 95 having a pair of opposed, flat, rectangular, downwardly converging shield or baffles 95a and 95b plates. The lower edges of the plates 95a and 95b are joined by a relatively narrow, rectangular, flat base 95c which, in turn, is received on and extends between the upper surfaces of the rails 91.

Rearwardly of the frontmost V-shaped emitter shield 95 are a plurality of equally spaced, L-shaped emitter shields 96. Each emitter shield or baffle 96 is a flat, rectangular, rearwardly and upwardly inclined, sheet metal plate 96 which has approximately the same dimensions and incline as the shield plate 95a. The plates 96 are each disposed transversely across rails 91 at an acute angle to from about 40° to about 70° and preferably 55° and in parallel relationship to the shield plate 95a, the plates 96 being in longitudinally spaced, transversely extending, parallel, relationship to all other shields 96. Each emitter shield 96 has a length approximately equal to or slightly greater than the transverse distance between rails 91. Each shield 96 has at its lower edge a horizontal, flat, rectangular base 96a which extends transversely between the rails 91 and is secured at its end portions to the upper surfaces of rails 91. Each of the bases 95a is in a common plane with other bases 95a and each has along its forward edge an upwardly turned lip 95b.

When the feet 94 of shield or deflector assembly 90 are appropriately received on the flange 42b, the emitter shields 95 and 96 are spaced well above the burner elements 43 and the structure of the emitter shields 95 and 96 are such that the plate 95a overhangs the front lip 96b of the first L-shaped emitter shield 96 and the first shield plate 96 overlaps the lip 96b of the second emitter shield 96, etc. covering the burner elements 43. Therefore, when the grease or drippings from the meat arranged vertically above the burner elements 43 on grid 78, fall from the meat, the grease or drippings will be received by one or more of the plates 95a or 96, as the case may be, and this grease will then pass downwardly along the surface of the plate 95a or 96 until it reaches the base 95c or 96b and is vaporized either along its travel or when it is on the base 94c or 95c. That grease which is not vaporized, will drain transversely off of one end or the other of the base 95c or 96b. In the same fashion, grease or drippings falling from the meat vertically above the plate 95b will be deflected by that plate down onto the base 95c.

The feet 94 are spaced longitudinally from each other so that the deflector assembly 90 can be slid rearwardly or forwardly over a short distance without engaging a bolt 44, the feet 94 sliding along the upper surface of the flange 42b. Thus, when the pilot light is to be lighted, the assembly 90 can be slid, rearwardly. When the deflector assembly 90 is slid forwardly, the crossbar 91 strikes the lower edge of the front panel 73 to arrest forward movement of the deflector assembly 90 with the assembly in vertical alignment over burner elements 43.

When the grid 78 is arranged at an incline, as shown in FIG. 1 or arranged horizontally over the fire guard 70, as shown in FIG. 2, the meat placed on the forward portion of the cooking grid 78 will be totally shielded from any radiation directly from the burner elements 43. Of course, as the emitter shields 95 and 96 are heated, they will themselves radiate some radiant energy; however, the amount of heat delivered to the meats on the forward portion of the cooking grid 76 will less than the radiant heat which is delivered at an acute angle upwardly and rearwardly through the openings between the adjacent emitter shields 96, toward the rear portion of the cooking grid 78. Thus, for those meats which require relatively high heat, such meat should be arranged toward the rear portion of the grid 76 so as to be exposed to the angularly radiating infrared radiation directly from the burners 43.

A slidable drip pan 98 is provided in the lower portion of the cabinet 10 and this drip pan can be removed periodically to remove any grease or drippings which drip off of the emitter shields 95 and 96 or drip directly into the pan 98. It will be observed in FIG. 2 that the rear edges of the emitter assemblies 30 are spaced from the back panel 72 of the fire guard 70 so that any meats arranged on the grid 78 rearwardly of the rearmost emitter shield 96 will drip directly onto the pan 98. This pan 98 can slide forwardly out of the cabinet 10, when the pan requires cleaning.

Figure 4:
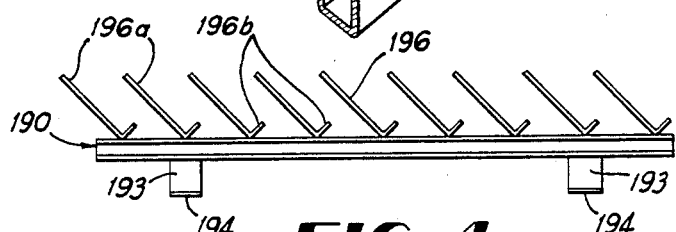
FIG. 4 is a side elevational view of a modified form of the shield and deflector assembly shown in FIG. 1 and FIG. 2.

In FIG. 4 is an alternate embodiment of the shield or deflector assembly, this alternate embodiment being denoted generally by the numeral 190. This alternate assembly 190 includes rails 191 which are identical to the rails 91; legs 193 which are identical to the legs 93 and feet 194 which are identical to the feet 94. The embodiment, however, has a plurality of V-shaped emitter shields 196 disposed transversely across the two rails 191, the emitter shields 196, respectively, having shield plates 196a which are respectively arranged in spaced parallel relationship angling up from the rails 191. The lower ends of the plates 196a are provided with upwardly and forwardly extending lips 196b, these lips being arranged at approximately 90° to the plates 196a. Thus, a V-shaped trough for the grease is provided by each emitter shield 196 whereas the emitter shields 95 and 96 of the preceding embodiment have flat bases 95c and 96a which provide additional area over which the drippings can pass and be vaporized. The embodiment of FIG. 4 is less expensive to produce than the deflector assembly 190 and is recommended for home use whereas the deflector assembly 90 is recommended for commercial use.

It will be obvious to those skilled in the art that many variations may be made in the embodiment here chosen for the purpose of illustrating the present invention, without departing from the scope thereof as defined by the appended claims.

What is claimed is:

1. An infrared grill of the type having a cabinet and an infrared emitter disposed within said cabinet said infrared emitter having an upper surface for generating infrared radiation upwardly, a cooking grid carried by said cabinet above and in spaced relationship to said infrared emitter, wherein the improvement comprises:

an emitter shield assembly disposed over said infrared emitter and below said cooking grid, said emitter shield assembly having spaced baffles extending over said emitter and spaced below said cooking grid for shielding said infrared emitter from drippings from food supported by said grid above said infrared emitter, said baffles being so disposed with respect to each other and with respect to said cooking grid, that the infrared radiation from the said infrared emitter will pass directly from said infrared emitter between said baffles and impinge on the food disposed on a portion of said cooking grid.

2. The infrared grill defined in claim 1 wherein said baffles are flat metal plates each disposed at an acute angle with respect to the surface of said infrared emitter.

3. The infrared grill defined in claim 2 wherein certain of said baffles, which are side-by-side, vertically overlap each other for protecting the surface of said infrared emitter from grease dripping from food vertically above said infrared emitter.

4. The infrared grill defined in claim 1 wherein said shield assembly includes a frame, means for spacing said frame above said grill, and wherein said baffles are secured by their lower ends to said frame, said baffles being in spaced, parallel relationship to each other and disposed at an acute angle to said surface of said infrared emitter.

5. The infrared grill defined in claim 1 wherein each of said baffles is a flat plate spaced from the next adjacent baffle and each of said baffles has a trough formed at the lower edge portion of the baffle for collecting said drippings adjacent and above said upper surface of said infrared emitter.

6. The infrared grill defined in claim 1 wherein said shield assembly includes a frame and support means for supporting said frame adjacent to and above said upper surface of said infrared emitter, said frame being slidable with respect to said infrared emitter.

7. The infrared grill defined in claim 1 wherein said infrared emitter includes a plenum and a foraminous, ceramic, gas burner element on said plenum for receiving a combustible mixture of air and gas discharged into said plenum, said shield assembly being spaced over said burner element, the baffles vertically overlapping each other, and extending over the entire surface of said burner element.

8. The infrared grill defined in claim 7 wherein said cooking grid is longer than said emitter and said shield, said baffles being at acute angles to said surface of said infrared emitter for directing infrared rays angularly toward the portion of said grill which extends beyond said emitter while said baffles protect the surface of said emitter from said drippings.

9. The infrared grill defined in claim 8 wherein said shield assembly includes a frame, legs extending from said frame and resting on said emitter for removably supporting said frame in spaced relationship over said infrared emitter, and wherein said baffles are secured by their lower end portions to said frame.

10. The infrared grill defined in claim 9 including a V-shaped baffle disposed at one end of said frame, said V-shaped baffle having one plate thereof disposed parallel the other of said baffles.

11. The infrared grill defined in claim 10 wherein said shield assembly is removable from said emitter by being lifted upwardly.

12. An assembly comprising an infrared emitter having gas infrared heating elements disposed horizontally, a frame surrounding said infrared elements, a plurality of spaced, angularly disposed baffles above said elements, spacing means for securing said baffles together and support means secured to said baffles and mounted on said frame for supporting said baffles in spaced relationship to and above said infrared elements.

13. The assembly defined in claim 12 including upwardly extending lips at the lower edges of said baffles, said lips cooperating with said baffles for collecting drippings which fall on said baffles.

14. The assembly defined in claim 12 including bases secured to the lower edges respectively of said baffles and lips, said lips extending upwardly from said bases, the upper edges of one baffle overlapping the lip of an adjacent baffle.

15. An infrared emitter assembly comprising:
(a) a plenum open at the top;
(b) means for introducing an air gas combustible mixture into said plenum;
(c) a burner assembly for closing the open top of said plenum, said burner assembly including:
   i. a plurality of ceramic foraminous, radiant burners arranged in juxtaposition;
   ii. a lower frame for supporting the bottom edges of said ceramic radiant burners;
   iii. an upper frame open for surrounding the upper edge portions of said ceramic radiant burners, said upper frame and said lower frame being joined for sandwiching said ceramic radiant burners, therebetween, said lower frame extending over the open upper end of said plenum; and
(d) means removably joining one of the frames to said plenum.

16. The infrared emitter assembly defined in claim 15 wherein said means for removably joining one of said frames to said plenum includes bolts passing through both of said frames and into the upper portion of said plenum.

17. The infrared emitter assembly defined in claim 15 including a shield assembly disposed over said emitter assembly, said shield assembly having a plurality of spaced, rectangular baffles extending transversely across said ceramic burners, means joining said baffles together, said baffles each being arranged at an acute angle to the ceramic burners for shielding the dripping of grease onto said ceramic burners while permitting the radiant heat to be directed angularly directly between adjacent shields in an upwardly direction.

18. The assembly defined in claim 17 including a cooking grid, said cooking grid being longer than said plenum and wherein said cooking grid is disposed in spaced relationship over said shield assembly.

19. The emitter assembly defined in claim 17 wherein said frame has a plurality of feet which are received on and can be slid along the upper surface of said upper frame so that said shield assembly may be moved longitudinally rearwardly and forwardly.

20. The emitter assembly defined in claim 15 wherein a baffle at one end of said baffles is a V-shaped baffle having a base in its central portion, one end of the V-shaped baffle overlapping a lower portion of the next adjacent baffle and the upper end of the next adjacent baffle overlapping the lower end of the baffle adjacent to it.

21. Process for simultaneously cooking meats at different rates comprising:
(a) disposing an infrared radiation emitter in a prescribed position for emitting infrared radiation in an upward direction;
(b) supporting meats to be cooked in transversely spaced locations above said emitter, one location being vertically above said emitter; and
(c) shielding the meat located in said one location from the full intensity of the infrared radiation from the emitter while permitting the maximum radiation from the emitter to impinge on the meat in the other location.

22. Process defined in claim 21 wherein the infrared radiation which impinges upon the meat at the other location, contact the meat at an acute angle.

23. The process defined in claim 21 wherein the step of shielding the meat in one location from the infrared radiation included also shielding the infrared emitter from dripping from the meat in said one location.

24. The process defined in claim 21 wherein the dripping from meat at the other location does not drip upon the infrared emitter.

25. An infrared grill comprising:
(a) a gas infrared burner having heating elements disposed generally horizontally along its upper surface and through which combustible gas passes and which are heated by combustion of the gas to emit infrared rays;
(b) an emitter shield disposed over said heating elements, said shield having spaced angularly disposed parallel baffles;
(c) a cooking grid in spaced relationship over said baffles, said grid having at least one dimension greater than a dimension of said shield, for providing a first cooking area on said grid which is over and shielded by said baffles from the infrared direct rays generated by said heating elements and for providing a second cooking area which is sufficiently spaced from said first cooking area that it is not over said baffles; and (d) said baffles being spaced apart sufficiently that the infared rays generated by said heating element can readily pass directly angularly upward between the spaced between the baffles and impinge upon the food disposed in said second cooking area for providing infrared heating of such food.

26. The infrared grill defined in claim 25 including upwardly extending lips respectively on the lower edges of said baffles for forming with said baffles, troughs which drain drippings from said first cooking area.

* * * * *